Nov. 18, 1958    J. H. PARKS    2,860,497
RESILIENT COUPLING FOR TORQUE TRANSMITTING DRIVE SHAFT
Filed Aug. 16, 1956
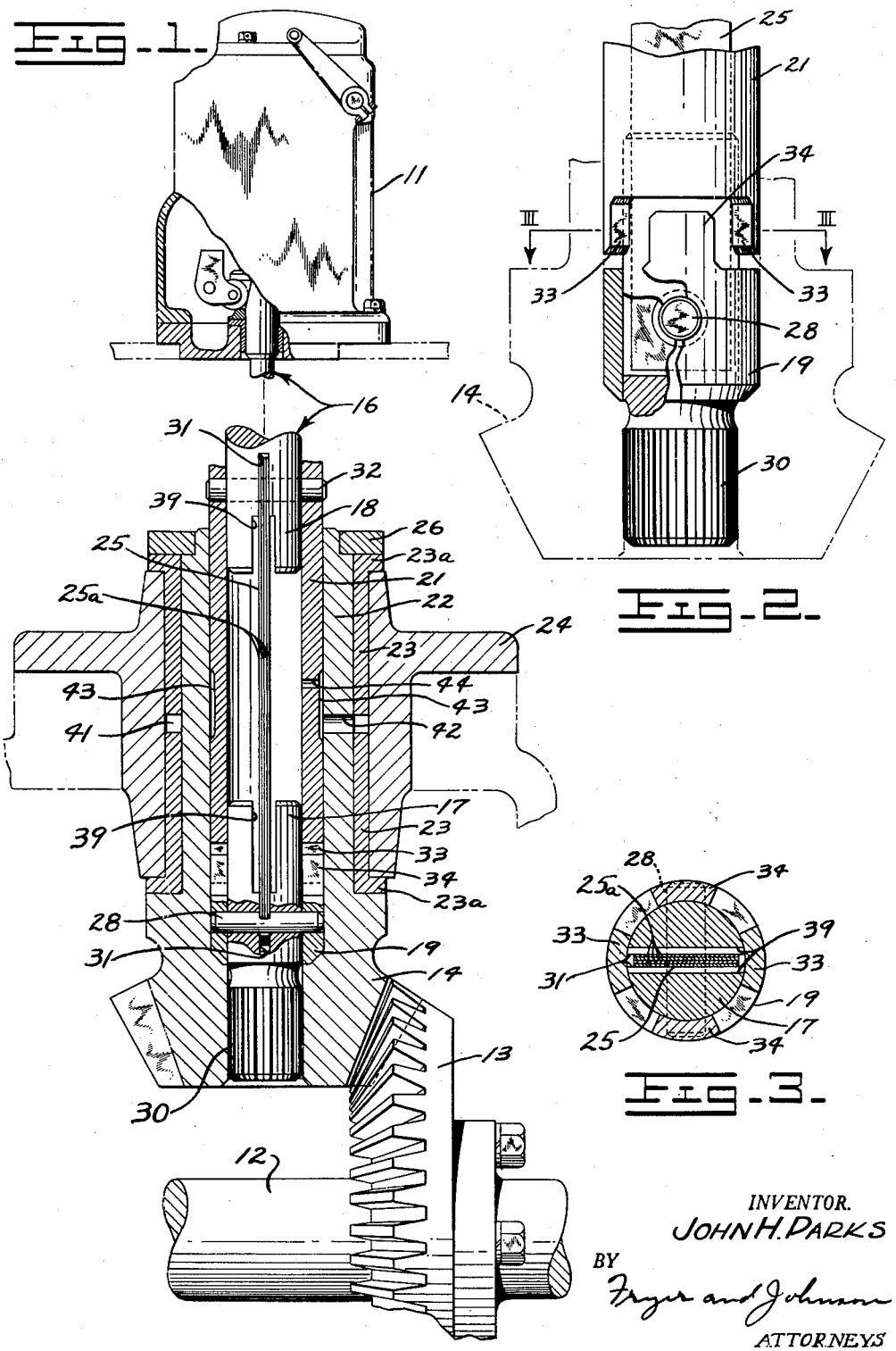
INVENTOR.
JOHN H. PARKS
BY
*Fryer and Johnson*
ATTORNEYS United States Patent Office 2,860,497
Patented Nov. 18, 1958

2,860,497

RESILIENT COUPLING FOR TORQUE TRANSMITTING DRIVE SHAFT

John H. Parks, Peoria, Ill., assignor to Caterpillar Tractor Co., Peoria, Ill., a corporation of California Application August 16, 1956, Serial No. 604,388

2 Claims. (Cl. 64—15)

This invention relates to resilient couplings and drive members for use in a torque transmitting shaft for the purpose of isolating the driven member from the vibrations of the driving members. More particularly, this invention relates to a resilient drive for an engine governor whereby the vibrations developed by cyclic irregularities of the drive elements are prevented from affecting the function of the governor. Furthermore, when varying loads are imposed on an internal combustion engine, harmonic resonance develops within the drive elements which may impose damaging effects on the governor as well as upon the drive members of the engine. By providing a resilient coupling or connector between the gear train of the engine and the engine governor, the whipping and vibrations developed in the camshaft and gear train of the engine are isolated or damped avoiding damage of the drive elements.

Vibrations of a natural frequency are inherent in the drive elements of a running engine which if allowed to propagate result in harmonics; increasing in frequency and magnitude which may have damaging effects on the engine components and cause improper governor reaction.

Generally, the coupling of the present invention comprises a rectangular torsion bar in the form of a flat spring blade structure interposed coaxially between and connected to the spaced end portions of a drive shaft in such a manner that the blade is the sole torque-transmitting member acting between the driving portion and the driven portion of said shaft. Moreover, the blade is so adapted that it will withstand varying degrees of torsional stresses in response to spasmodic or cyclic load variations imposed upon the drive components without damage. An important feature of this invention is in the provision of means formed within the coupling whereby under high torsional loads the effective length of the blade is reduced; producing a shorter and stiffer spring rate, which instantaneously causes a sharp rise in spring force in response to high loads. In addition to increasing the spring force of the blade, the change in effective length thereof immediately alters the frequency of vibrating forces. Another feature of this invention is the provision of suitable means in the coupling which abut under excessive loads to form a solid drive and prevent overstressing of the spring blade.

Many resilient couplings and shock absorbing components have been used in the industry in an attempt to dampen vibrations and isolate critical controls which would be adversely affected. As an example, resilient gears are sometimes used in a gear train within which are disposed distortable members which act as the sole torque transmitting drive between the driving portion and the driven portion of the gear. In most modern engines, space is a limiting factor, making it impractical to use such resilient couplings or gears. Furthermore, in this type of the resilient drive no precautions are taken to alter the frequency of vibrations which tend to develop increasing harmonic torque loads, resulting in damage of the engine and drive components.

It is, therefore, the principal object of this invention to provide a resilient coupling interposed within a torque transmitting shaft which is capable of isolating the vibrations of an engine crankshaft from the driven member through a simple torque transmitting connection in said coupling. Another object of this invention is to provide a "soft drive" coupling within a drive shaft that is substantially of no greater physical dimension than the shaft. Another object of the invention is to provide a simple distortable blade structure connected to spaced portions of the torque transmitting shaft whereby said blade is the sole torque-transmitting member acting between the driving portion and the driven portion of said shaft and wherein the blade is distorted in varying degrees in response to torque load changes transferred through the shaft. Still another object of this invention is to provide limiting means in the ends of said shaft portions so that under conditions of high torque loads, the natural frequency of vibrations inherent in the blade will be altered by virtue of a change in effective length of the resilient blade. Further and more specific objects are made apparent in the following specification wherein reference is made to the accompanying drawings.

In the drawings:

Fig. 1 illustrates an engine governor and the drive therefor in which the resilient coupling of the present invention is shown in vertical section;

Fig. 2 is a view in elevation of a portion of the resilient coupling with parts broken away to show the structural details thereof and illustrating the means provided for insuring a positive drive connection which is effective only under excessive torque loads; and Fig. 3 is a sectional view taken along the line III—III of Fig. 2 illustrating in detail the relationship between the resilient blade and one end portion of the shaft and showing the relationship between the positive drive members incorporated in this invention.

Referring to Fig. 1 of the drawings, an engine governor 11 is shown as driven from a crankshaft 12 through a suitable gear 13, pinion 14, and governor drive shaft generally indicated 16. Drive shaft 16 has a driving portion 17 and a driven portion 18 which are retained in axial alignment by suitable sleeve formations 19 and 21 connected to the driving and driven portions 17 and 18 respectively in a manner subsequently to be described. The sleeve portion 21 is journalled for limited rotational movement within a hub portion 22 of pinion 14 which in turn is rotatably journalled in bearings 23 fixed in the engine housing, a part of which is shown at 24. Suitable thrust flanges 23a integral with bearings 23 absorb axial thrust of the gear, whereas a retaining member 26 secures the pinion 14 and bearings 23 against axial displacement within the engine housing 24.

Torque is transmitted from the driving portion 17 to the driven portion 18 of shaft 16 through a thin, rectangular torsion bar in the form of a flat spring blade structure 25. The blade structure is preferably comprised of a plurality of flat spring members 25a which are retained as a spring pack in suitable slots 31 formed in the ends of shaft portions 17 and 18.

A pin 28 retained within suitably aligned bores in shaft portion 17, sleeve portion 19 and one end of the blade 25 secures these members against relative rotation. Shaft portion 17 is secured to pinion 14 through a splined connection as at 30. A pin 32 similarly secures sleeve 21 and the other end of blade 25 to shaft portion 18. Thus, the shaft portions 17 and 18 are connected together by blade member 25 to form an assembly of components for ease in handling. Additionally blade 25 is of sufficient column strength to maintain the adjacent ends of sleeves 19 and 21 in axial spaced relationship. In other words the blade resists elongation and compression sufficiently to prevent any material axial movement of the separate shaft portions.

Under normal load conditions, the natural vibrations inherent in the timing gear train and camshaft of an engine are absorbed by the blade 25 thereby isolating these disturbances from affecting the function of the governor. As the loads increase in magnitude and frequency, a condition of harmonics tends to develop which if not arrested may result in vibrations of increasing magnitude and frequency and cause damage to the governor and associated components. Under these conditions, the blade 25 is twisted to such a degree that physical contact is made between the blade and the walls of a gap 39 provided in the ends of shaft portions 17 and 18. Immediately upon contacting the gaps 39 the effective length of the blade is reduced, whereby the frequency of vibrations passing through the blade is abruptly changed; preventing a build up of harmonics. If the torque load exceeds this condition and approaches an excessive degree, suitable means are provided to establish a positive drive between driving portion 17 and driven portion 18 of the shaft 16. To this end a plurality of engageable but not normally engaged axially extending projections or dogs 33 and 34 are provided so as to limit the degree of torsional distortion permissible and establish a positive drive between sleeve portions 19 and 21 when said dogs 33 and 34 abut.

Suitable passages are provided for permitting a supply of engine lube oil into the area surrounding the flat blade 25. The bearings 23 are of such length as to define an annular space 41 therebetween. At least one passage 42 may be provided in the hub portion 22 of the pinion 14 which registers with a shallow annular recess 43 and with a suitable drilled passage 44 provided in the sleeve member 21. Engine lube oil supplied to the bearing surfaces by conventional means (not shown) is forced into the area surrounding the spring blade providing a damping effect upon the distortions to which the blade 25 is subjected.

The flat blade is disclosed in Fig. 1 as preferably comprising of a plurality of adjacent disposed spring members 25a which work in unison as would a solid blade with the same physical thickness with the added feature that some limited frictional movement will take place between adjacent faces of the springs 25a to dampen the spring action and further tend to limit excessive distortion of the torque transmitting blade assembly 25.

From the foregoing description it will be readily understood that the resilient coupling disclosed in the accompanying drawings is economical in cost and occupies substantially no greater area than does the actual shaft and still is effective to completely isolate a driven member from the torsional vibrations of the driving components of an engine by virtue of the flat blade torque transmitting member 25.

I claim:

1. A resilient coupling in a power transmitting shaft for connecting a driving shaft portion to a driven shaft portion in spaced axial alignment, comprising a flat blade connecting said shaft portions, tubular bearing members secured to the end of each portion and circumscribing said blade, driving dogs formed in the adjacent ends of said members to establish a positive drive between the driving and driven shaft portions under conditions of excessive torque loads, whereby torsional loads imposed by the driving portion twist said blade, and means formed in ends of said shaft portions to alter the effective length of said blade under certain conditions of torque to alter the frequency of vibrations and prevent harmonic increase.

2. In a torque transmitting drive shaft having a driving portion thereof in spaced axial alignment with a driven portion thereof, sleeve formations integral with the ends of said portions, a resilient blade anchored to the ends of said shaft portions and disposed within said sleeve formations, a gap between said blade and the ends of said shaft portions in close proximity to the anchoring means, whereby said blade is the sole torque transmitting connection between the driving and the driven portions of said shaft and whereby said gap defines a range of deflection of said blade in response to normal torque transmission and alters the frequency of vibrating influences so as to prevent harmonic build-up.

References Cited in the file of this patent

UNITED STATES PATENTS

| | | |
|---|---|---|
| 1,290,370 | Serrell | Jan. 7, 1919 |
| 1,651,822 | Johnston | Dec. 6, 1927 |
| 1,712,219 | Knudsen | May 7, 1929 |
| 1,765,209 | Dalton et al. | June 17, 1930 |
| 1,953,211 | Benedek | Apr. 13, 1934 |
| 2,027,842 | Schmitter | Jan. 14, 1936 |
| 2,643,529 | Thomas | June 30, 1953 |